United States Patent [19]
Leonowich

[11] Patent Number: 5,734,675
[45] Date of Patent: Mar. 31, 1998

[54] RECEIVER SHARING FOR DEMAND PRIORITY ACCESS METHOD REPEATERS

[75] Inventor: Robert Henry Leonowich, Township of Muhlenberg, Berks County, Pa.

[73] Assignee: Lucent Technologies Inc., Murray Hill, N.J.

[21] Appl. No.: 586,268

[22] Filed: Jan. 16, 1996

[51] Int. Cl.$^6$ .................................................. H04L 25/20
[52] U.S. Cl. .................... 375/211; 370/274; 370/293; 370/447; 370/462; 340/825.5
[58] Field of Search .................. 375/211, 295, 375/316; 370/274, 279, 293, 315, 320, 346, 445, 449, 462, 461, 463, 433, 447, 455, 446, 502; 455/11.1, 14, 84; 340/825.5; 178/71.1

[56] References Cited

U.S. PATENT DOCUMENTS

| | | |
|---|---|---|
| 4,583,088 | 4/1986 | Bux et al. |
| 4,654,889 | 3/1987 | Shutterly |
| 4,677,613 | 6/1987 | Salmond et al. |
| 4,701,909 | 10/1987 | Kavehrad et al. |
| 4,807,223 | 2/1989 | Wells ........................ 370/461 |
| 5,016,159 | 5/1991 | Maruyama |
| 5,167,019 | 11/1992 | Fava et al. ........................ 370/461 |
| 5,189,414 | 2/1993 | Tawara ........................ 340/825.5 |
| 5,576,702 | 11/1996 | Samoylenko ........................ 370/455 |
| 5,598,406 | 1/1997 | Albrecht et al. ........................ 370/296 |
| 5,648,984 | 7/1997 | Kroninger et al. ........................ 375/211 |

Primary Examiner—Wellington Chin
Assistant Examiner—Jean B. Corrielus

[57] ABSTRACT

A shared receiver demand priority repeater for use in a shared receiver demand priority repeater network having at least two transmission media, has a demand priority repeater core. A receiver is coupled to the demand priority repeater core. A multiplexer is coupled between the receiver and the at least two transmission media. A transmitter for each the transmission media is coupled between the demand priority repeater core and the transmission media. Wherein the multiplexer couples a selected one of the transmission media to the receiver in response to the demand priority repeater core.

The multiplexer can comprise an address selectable switch.

A method is described for interfacing a demand priority repeater core to at least two downlinks, each downlink coupled to a device.

19 Claims, 2 Drawing Sheets

RECEIVER SHARING FOR DEMAND PRIORITY ACCESS METHOD REPEATERS

FIELD OF THE INVENTION

This invention relates to the field of network communications, and more particularly to the field of network communications utilizing carrier sense multiple access with collision detection.

BACKGROUND OF THE INVENTION

Personal computers have provided a dramatic growth in computing power and accessibility. With the advent of faster personal computers and large storage devices, client server based networks having distributed file systems have come into prominence.

One of the most popular access methods employed by PC LANs utilizes Carrier Sense Multiple Access with Collision Detection (CSMA/CD). CSMA/CD is utilized by Ethernet based LANs as well as other LANs. CSMA/CD is a method of having multiple workstations access a transmission medium by listening until no signals are detected, then transmitting and checking to determine if more than one signal is present. Each workstation attempts to transmit when that workstation believes that the network is free. If there is a collision, each workstation attempts to retransmit after a random delay. The delay for retransmission is randomly selected for each workstation after each collision within the network.

CSMA/CD hub based networks such as 1BASE-5, 10BASE-T and 100BASE-T typically require an independent receiver and transmitter for each link. Referring to FIG. 1 there is shown a block diagram representation of an CSMA/CD repeater 10. The CSMA/CD repeater 10 has a repeater core 12 which performs control functions and transfer of the data packets between ports. A transmitter circuit 14 and a receiver circuit 16 are coupled between the repeater core 12 and each of the links, channel 0 through channel n. The receiver circuit 16 can include timing circuits, adaptive equalizers, comparators and squelch circuits. The replication of the receiver circuit 16 for each channel results in a large duplication of circuitry as any channel 18 can receive a packet of data at any time.

Accordingly, there is a need to provide an efficient system for linking a plurality of channels to a repeater core.

SUMMARY OF THE INVENTION

In accordance with the present invention, there is provided in a shared receiver demand priority repeater network having at least two transmission media, a shared receiver demand priority repeater. The shared receiver demand priority repeater has a demand priority repeater core. A receiver is coupled to the demand priority repeater core. A multiplexer is coupled between the receiver and the at least two transmission media. A transmitter for each of the transmission media is coupled between the demand priority repeater core and the transmission media. Wherein the multiplexer couples a selected one of the transmission media to the receiver in response to the demand priority repeater core.

In a further enhancement of the present invention the multiplexer comprises an address selectable switch.

A method is described for interfacing a demand priority repeater core to at least two downlinks where each downlink is coupled to a pollable device. The method comprising the steps of selectively coupling a downlink corresponding to the selected device to a receiver, sending an acknowledgment to the selected device which enables the selected device to transmit, receiving a response from the selected device and processing the response.

In an enhancement of the present invention the method further comprises the step of prioritizing a request to transmit response.

DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited for use in 100BASE-VG (100VG-AnyLAN) networks, and shall be described with respect to this application, the methods and apparatus disclosed here can be applied to other communication networks with a demand priority access method.

Demand priority access method provides support for time sensitive applications such as video and multimedia as part of the 100BASE-VG (100VG-AnyLAN) standard providing 100 Mbits/s over voice grade unshielded twisted pair cable. By managing and allocating access to the network centrally, at a hub rather than from individual workstations, sufficient bandwidth for a particular application is provided on demand. The 100BASE-VG (100VG-AnyLAN) network can utilize the following cable types: four pair, category three voice grade, unshielded twisted pair cable; four pair, category four, unshielded twisted pair cable; four pair, category five, unshielded twisted pair cable; two pair, shielded, twisted pair cable; optical fibers; as well as other cable types. A 100BASE-VG (100VG-AnyLAN) repeater, also referred to as a hub, has two types of ports, down-link ports and an optional uplink port. One down-link port is required for a connection to each link.

In a 100BASE-VG (100VG-AnyLAN) network the Demand Priority Protocol (DPP) is defined as the Media Access Control (MAC) sublayer of the ISO Open System Reference Model. DPP defines the process of determining which packet to transmit, and in what order they are processed.

The repeater (hub) performs a sequential poll of the ports the devices are connected to. If a device connected to that port is ready to transmit a data packet, it sends a normal priority or a high priority request to the hub. If a device is idle, it sends an idle signal to the hub. A polling cycle begins with the lowest numbered port and is complete when the highest numbered connected port is polled. If more than one device wants to transmit, then the hub determines transmission order based on the priority (normal or high) of the request and on the physical port order.

When a device wants to transmit a packet, it sends a request to the hub. The hub acknowledges the request from the source device and the source device begins to transmit the data packet to the hub. The hub decodes the destination address contained in the packet and automatically sends the incoming data packet to the destination port and in turn to the destination device.

If more than one device requests to transmit in a polling cycle, the hub implements a prioritized arbitration procedure to determine what order the packets will be transmitted in. The arbitration procedure is based on the port order of the source device and the priority level of the data packet. All high priority requests will be serviced before normal priority requests.

After completion of the transmission of the data packet, the hub polls all the devices again to determine if any requests are pending.

Figure 1:
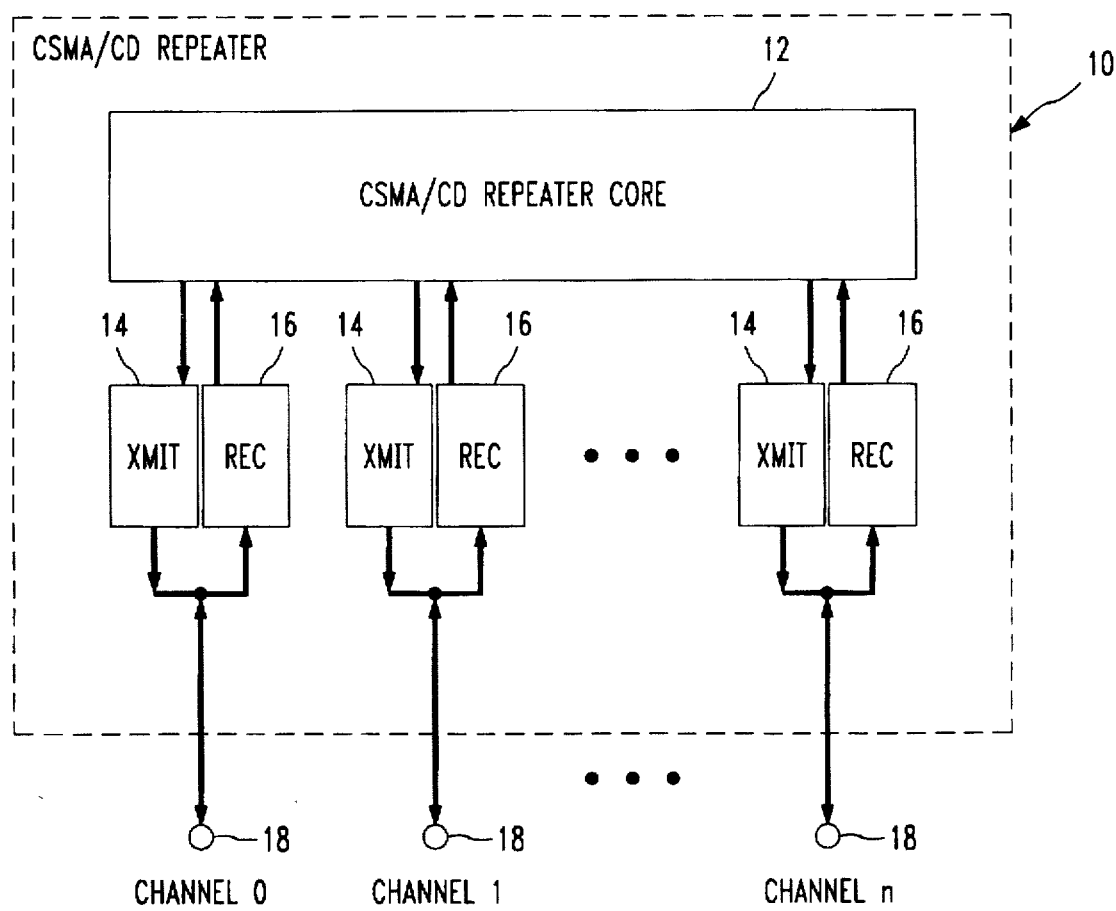
FIG. 1 is a block diagram of a CSMA/CD repeater 10.

An architecture similar to that shown in FIG. 1 having an independent receiver and transmitter for each down-link port can be utilized for the 100BASE-VG (100VG-AnyLAN) network. However, as the receiver circuit 16 typically includes timing circuits, adaptive equalizers, comparators and squelch circuits, the replication of the receiver circuit 16 for each channel results in a large duplication of circuitry as only one channel 18 shown in FIG. 1 can receive a packet of data at any time.

Figure 2:
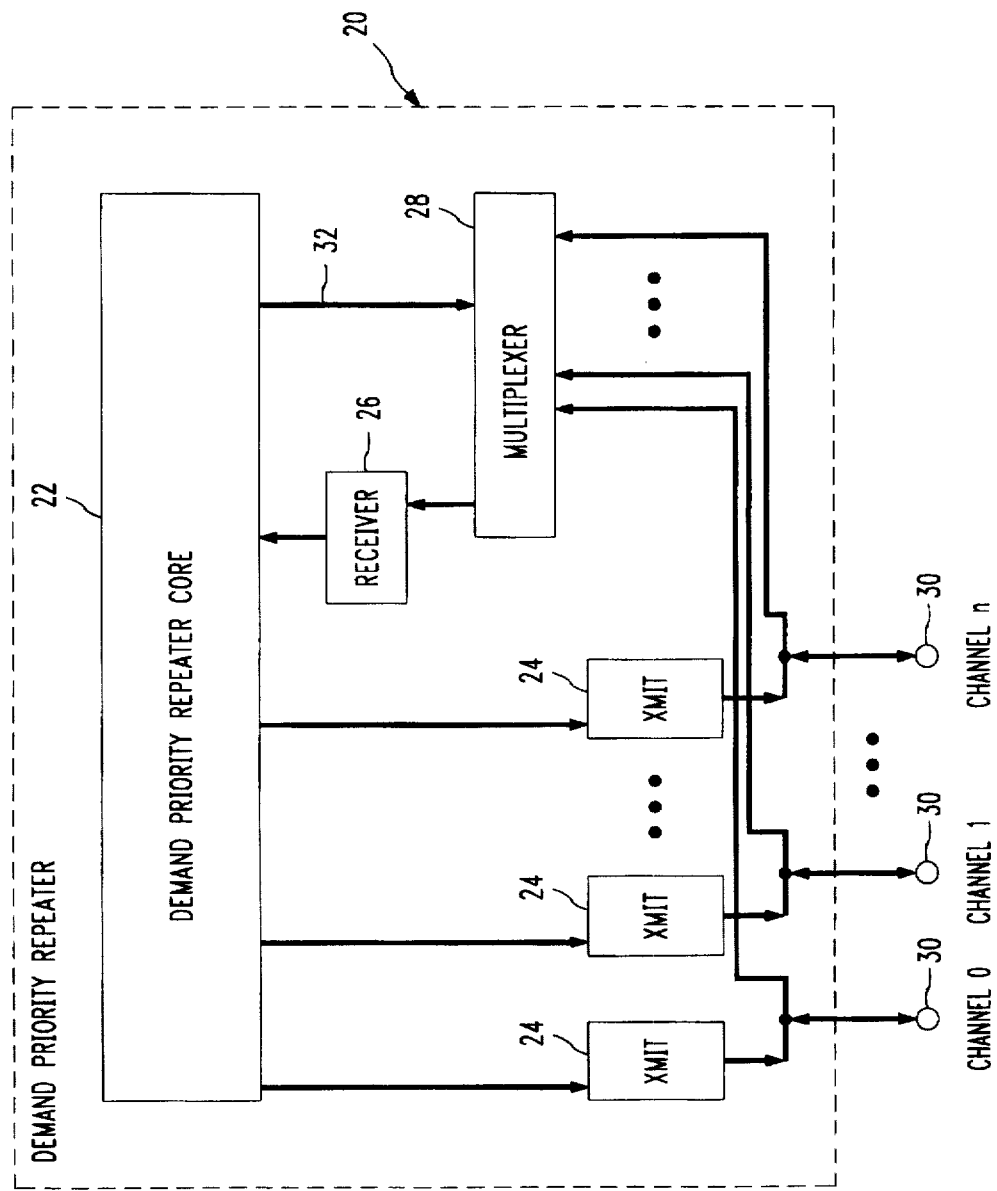
FIG. 2 is a block diagram of the present invention, a demand priority repeater utilizing shared receiver architecture.

Referring now to FIG. 2 there is shown a representative embodiment of the present invention, a demand priority repeater utilizing shared receiver architecture 20. The demand priority repeater 20 comprises a demand priority repeater core 22. The demand priority repeater core 22 is coupled to transmitters 24. A receiver 26 is coupled between the demand priority repeater core 22 and a multiplexer 28. The multiplexer 28 is coupled to an address line 32. In response to a signal on the address line 32 the multiplexer 28 selects one of the n inputs to pass through to the receiver 26. The multiplexer 28 allows the n inputs one for each down-link port to share the single receiver. The output of a transmitter 24 and a corresponding input of the multiplexer 28 are coupled to a channel 30, as in a category three voice grade cable illustrated in FIG. 2.

While the channel 30 is illustrated as a common transmission media for the transmission and reception of signals, in other cable systems such as a category five system or with optical fibers, there can be a one transmission media for the transmission of signals and a separate transmission media for the reception of signals for each channel.

The 100BASE-VG (100VG-AnyLAN) network is based on the IEEE 802.12 standard for transmitting IEEE 802.3 Ethernet and IEEE 802.5 token ring frame information at 100 Mbits per second. The 100BASE-VG (100VG-AnyLAN) network is assumed to be homogenous, supporting only one frame format, and not both IEEE 802.3 Ethernet and IEEE 802.5 token ring frames at the same time. The 100BASE-VG (100VG-AnyLAN) utilizes a demand priority repeater core 22 which provides a centrally controlled access method. This access method is a simple, deterministic request method that maximizes network efficiency by eliminating network collisions and token rotation delays. The demand priority protocol has one level of priority for standard data and another level of priority for multi-media data, which allows for effective support of time critical multi-media applications including real-time video teleconferencing and interactive video. The physical topology of the 100BASE-VG (100VG-AnyLAN) network is a star having a hub, such as the demand priority repeater 20 at the focal point.

In a 100BASE-VG (100VG-AnyLAN) network, when a channel becomes active is very deterministic. The activity of a channel can be predicted precisely. As only one of the n channels 30 will be active at any given time, it is not necessary to replicate the receiving circuitry 26 for each corresponding channel 30. By utilizing a multiplexer 28 a single receiver 26 can be coupled to all of the n channels 30, thus requiring only one receiver 26 for all of the downlink ports. The receiver circuit 26 typically includes timing circuits, adaptive equalizers, comparators and squelch circuits. By predicting which channel 30 will be active, and coupling the receiver circuit 26 through the multiplexer 28 to the corresponding active channel, the replication of the receiver circuit 26 for each channel is avoided, eliminating a large duplication of circuitry for each channel 30.

The multiplexer 28 can be implemented with a variety of designs including an address selectable switch as well as other devices and circuits that are well known to those skilled in the art. The address line 32 provides the multiplexer 28, such as an address selectable switch with the address of the selected device when the demand priority repeater core 22 (hub) selects a device to transmit its data packet.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

I claim:

1. A shared receiver demand priority repeater network comprising:

a demand priority repeater core;

at least two transmission media;

a receiver coupled to said demand priority repeater core;

a multiplexer coupled between said receiver and said at least two transmission media;

a transmitter for each of said at least two transmission media, said transmitter coupled between said demand priority repeater core and one of said at least two transmission media;

wherein said multiplexer couples a selected one of said at least two transmission media to said receiver in response to said demand priority repeater core.

2. The network as recited in claim 1 wherein said multiplexer comprises an address selectable switch.

3. The network as recited in claim 1 wherein said at least two transmission media comprise unshielded twisted four pair cable.

4. The network as recited in claim 1 wherein said at least two transmission media comprise shielded twisted pair cable.

5. The network as recited in claim 1 wherein said at least two transmission media each comprise an optical fiber.

6. The network as recited in claim 1 wherein said demand repeater core routes an Ethernet data frame.

7. The network as recited in claim 1 wherein said demand repeater core routes a token ring data frame.

8. In a shared receiver demand priority repeater network having at least two transmission media, a demand priority repeater comprising:

a demand priority repeater core;

a receiver coupled to said demand priority repeater core;

a multiplexer coupled between said receiver and said at least two transmission media;

a transmitter for each of said at least two transmission media, said transmitter coupled between said demand priority repeater core and one of said at least two transmission media;

wherein said multiplexer couples a selected one of said at least two transmission media to said receiver in response to said demand priority repeater core.

9. The device as recited in claim 8 wherein said multiplexer comprises an address selectable switch.

10. The device as recited in claim 8 wherein said demand repeater core routes an Ethernet data frame.

11. The device as recited in claim 8 wherein said demand repeater core routes a token ring data frame.

12. A method of interfacing a demand priority repeater core to at least two downlinks, each downlink coupled to a device, the method comprising the steps of:

selecting a device;

selectively coupling a downlink corresponding to said selected device to a receiver;

sending an acknowledgment to said selected device wherein enabling said selected device to transmit a response;

receiving said response from said selected device;

processing said response.

13. The method as recited in claim 12 further comprising the step of prioritizing a request to transmit response.

14. The method as recited in claim 13 wherein said prioritizing comprises evaluating a level of said request to transmit response.

15. The method as recited in claim 13 wherein the step of prioritizing a request is a demand priority access method.

16. The method as recited in claim 12 wherein said demand repeater core routes an Ethernet data frame.

17. The method as recited in claim 12 wherein said demand repeater core routes a token ring data frame.

18. The method as recited in claim 12 wherein a multiplexer couples said downlink corresponding to said selected device to said receiver.

19. The method as recited in claim 18 wherein said multiplexer comprises an address selectable switch.

* * * * *